United States Patent
Wang et al.

(10) Patent No.: US 10,940,582 B2
(45) Date of Patent: Mar. 9, 2021

(54) LEG POWER SYSTEM STRUCTURE OF ELECTRICALLY DRIVEN FOUR-LEGGED ROBOT

(71) Applicant: HZ UNITREE TECHNOLOGY CO., LTD., Zhejiang (CN)

(72) Inventors: Xingxing Wang, Zhejiang (CN); Zhiyu Yang, Zhejiang (CN)

(73) Assignee: HangZhou YuShu Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/492,528

(22) PCT Filed: Mar. 8, 2018

(86) PCT No.: PCT/CN2018/078412
§ 371 (c)(1),
(2) Date: Sep. 9, 2019

(87) PCT Pub. No.: WO2018/161936
PCT Pub. Date: Sep. 13, 2018

(65) Prior Publication Data
US 2020/0282554 A1    Sep. 10, 2020

(30) Foreign Application Priority Data
Mar. 10, 2017    (CN) .......................... 201710149070.7

(51) Int. Cl.
B25J 17/00    (2006.01)
B25J 9/12     (2006.01)
(Continued)

(52) U.S. Cl.
CPC ............... *B25J 9/126* (2013.01); *B25J 9/102* (2013.01); *B25J 9/104* (2013.01); *B25J 9/106* (2013.01);
(Continued)

(58) Field of Classification Search
None
See application file for complete search history.

(56) References Cited

U.S. PATENT DOCUMENTS 4,565,487 A * 1/1986 Kroczynski ............ B62D 57/02
180/8.6
4,766,775 A * 8/1988 Hodge ....................... B25J 9/08
74/490.01
(Continued)

FOREIGN PATENT DOCUMENTS

CN    101602382 A    12/2009
CN    203819377 U    9/2014
(Continued)

OTHER PUBLICATIONS

International Search Report based on corresponding Application No. PCT/CN2018/078412; dated Apr. 13, 2018.

*Primary Examiner* — Bentsu Ro
(74) *Attorney, Agent, or Firm* — Muncy, Geissler, Olds & Lowe, P.C.

(57) ABSTRACT

A leg structure of a quadruped robot includes a body and four separate leg modules. Each leg module includes a thigh motor assembly, a calf motor assembly, a hip joint motor assembly and an associated linkage and fixing base of the hip joint motor assembly. The hip joint motor drives the thigh and calf assembly through a parallelogram mechanism, the thigh motor assembly directly drives the thigh rod assembly, and the calf motor assembly drives the calf assembly through an anti-parallelogram mechanism. The joint motor assemblies are independent of each other and all the motor assemblies are modularized; the thigh and calf motor assemblies have a good ability to prevent external impact, and the joints on the robot body, formed by using the (Continued)

motor assemblies, have a large working space, thus ensuring the movement flexibility of the robot.

11 Claims, 10 Drawing Sheets

(51) Int. Cl.
*B25J 9/10* (2006.01)
*B25J 19/00* (2006.01)
*B62D 57/032* (2006.01)

(52) U.S. Cl.
CPC ............... *B25J 9/108* (2013.01); *B25J 17/00* (2013.01); *B25J 19/0004* (2013.01); *B25J 19/0054* (2013.01); *B25J 19/0075* (2013.01); *B62D 57/032* (2013.01)

(56) References Cited

U.S. PATENT DOCUMENTS 6,458,011 B1 * 10/2002 Inoue ..................... B25J 19/005
 446/376
6,636,781 B1 * 10/2003 Shen ....................... B08B 9/045
 318/568.11

FOREIGN PATENT DOCUMENTS

| CN | 104802874 A | 7/2015 |
| CN | 104890759 A | 9/2015 |
| CN | 105383587 A | 3/2016 |
| CN | 106476928 A | 3/2017 |
| CN | 106904226 A | 6/2017 |
| CN | 206579733 U | 10/2017 |
| KR | 101363873 B1 | 2/2014 |

\* cited by examiner

LEG POWER SYSTEM STRUCTURE OF ELECTRICALLY DRIVEN FOUR-LEGGED ROBOT

TECHNICAL FIELD

The present invention relates to a leg structure of a quadruped robot, and in particular to a leg power system structure of an electrically driven four-legged robot.

BACKGROUND ART

Compared with wheeled robots, legged robots have stronger terrain adaptability and can flexibly move in complex terrain environments. Research institutes at home and abroad are striving to advance the process of four-legged robots. At present, a pure motor-driven power system has gradually become the mainstream power system of small and medium-sized four-legged robots due to its many advantages such as low noise, high reliability and low cost. However, due to the limitation of the current process and structure of motors and reducers, the existing four-legged robot electrically drives joints, has a large size, a complicated structure, a large weight, and can hardly withstand a large axial impact force, resulting, in a damage. On the other hand, a transmission mechanism currently adopted by many legged robots has its leg drive links directly exposed to the outside and thus is easily damaged by collision from the external environment. For example, the Cheetah four-legged robot developed by MIT has two motors for forward-lift hip joints and knee joints coaxially integrated in parallel with each other. Although it has a high degree of joint integration, the structure is complicated and cannot withstand axial impact and an external protection frame has to be used to protect the motors and the joints. The structure integrating two motor-driven joint units greatly limits the movement space of the thigh joints and thus affects the performance of the four-legged robot, and the exposed leg drive links are easily damaged by external impact.

SUMMARY OF THE INVENTION

In view of the deficiencies of the prior art, the objective of the present invention is to provide a leg power system structure of a four-legged robot with compact structure high degree of integration and good anti-fall performance.

To achieve the above objective, the technical solution of the present invention is as follows:

A leg power system structure of an electrically driven four-legged robot, comprising a body and four independent leg modules (i.e., a first leg module, a second leg module, a third leg module, and a fourth leg module), wherein the four independent leg modules are arranged in a bilateral symmetry on both sides of the body, and each leg module is connected and fixed to the body by a rotating pair; and each leg module comprises a thigh and calf assembly and a side-lift hip joint motor assembly.

As a preferred technical means, the thigh and calf assembly comprises a thigh motor assembly, a thrust bearing, a thigh rod assembly, a calf driving crank, a calf motor assembly, a calf drive link, a calf assembly, and a calf rotation pin. The calf motor assembly is fixed to the thigh rod assembly, and the calf driving crank is fixed to an output shaft of a calf motor planetary gear reducer of the calf motor assembly, and the output shaft drives the calf driving crank to rotate. The calf rotation pin is fixed to a tail end of the thigh rod assembly, and the calf assembly rotates around the calf rotation pin.

As a preferred technical means, the thigh rod assembly is provided with a thigh base and a thigh rod, wherein the thigh base is used for accommodating the calf driving crank and a calf drive link; the thigh rod is a cavity-shaped part penetrating up and down, and an end portion of the thigh rod is provided with an end pin hole for passing the calf rotation pin; the calf rotation pin sequentially passes through the end pin hole of the thigh rod assembly and an upper end portion of the calf assembly; and the calf assembly constitutes a rotating pair together with the calf rotation pin through a built-in bearing pair. The entire calf transmission mechanism may be placed inside the thigh rod assembly to avoid damage to fragile link parts when the four-legged robot falls or is collided.

As a preferred technical means, the calf drive link is disposed inside the thigh rod assembly, the calf driving crank, the calf drive link, the calf assembly and the thigh rod assembly together constitute an anti-parallelogram transmission mechanism, and the calf motor assembly, an output shaft of the calf motor assembly is fixedly connected with the calf driving crank, and the output shaft of the calf motor assembly drives the calf driving crank to rotate, which has the advantages of compact structure, small occupied space, small transmission gap, and high stability and reliability.

As a preferred technical means, an output shaft of the thigh motor assembly is fixed to one side of the upper end portion of the thigh rod assembly, and a thrust bearing is disposed between the thigh motor assembly and the upper end portion of the thigh rod assembly; and the calf motor assembly is fixedly mounted on the other side of the upper end portion of the thigh rod assembly. The thrust bearing directly transfers to the thigh motor housing an external impact force transferred from a calf motor housing to the thigh rod assembly, so that the internal components of fragile thigh and calf motors are not damaged by the external impact force, thereby increasing the anti-fall performance.

As a preferred technical means, the thigh rod assembly comprises a cooling fan, a second cooling fin group, a thigh base, and a thigh rod; the thigh rod is fixedly connected with the thigh base; the second cooling fin group is fixed on an inner wall of the thigh base; the cooling fan is fixed on the thigh base; the thigh base is provided with an air inlet; and the cooling fan blows external cold air through the air inlet into a cavity formed by the thigh base and the calf motor assembly, so that heat transferred to the second cooling fin group and a first cooling fin group from the calf motor housing and a calf motor front end cover is taken away by the cold air and discharged to the external environment through the hollow thigh rod. Due to adoption of built-in cooling air circulation, the power system structure of the present invention is more compact and the cooling system is less susceptible to damage by an external impact force.

As a preferred technical means, the calf motor assembly comprises an anti-fall motor protection plate, a calf motor rear end cover assembly, a calf permanent magnet brushless motor, a calf motor housing, a calf motor planetary gear reducer, a calf motor front end cover, and a first cooling fin group. The anti-fall motor protection plate is fixedly connected with the calf motor ear end cover assembly, and the calf motor rear end cover assembly is fixedly connected with an end face of the calf motor housing. The anti-fall motor protection plate transfers to the calf motor housing a lateral impact force coming from the outside, through an outer ring of the calf motor rear end cover assembly. A stator core winding of the calf permanent magnet brushless motor is fixedly connected with the calf motor housing. A gear ring of the calf motor planetary gear reducer is fixedly connected with an inner end face of the calf motor housing. A rotor output shaft of the calf permanent magnet brushless motor inputs a rotation motion of the motor into the calf motor planetary gear reducer, and a planetary carrier output shaft on the calf motor planetary gear reducer outputs the rotation motion to the calf driving crank. The calf motor front end cover is fixedly connected with the calf motor housing. The first cooling fin group is closely attached and fixed to the calf motor front end cover, and heat generated inside the calf motor is transferred to the calf motor front end cover through the calf motor housing, and then the heat is transferred to the first cooling fin group.

As a preferred technical means, the thigh motor assembly comprises a thigh motor rear end cover assembly, a thigh permanent magnet brushless motor, a thigh motor housing, a first hip joint rotation pin, a thigh motor planetary gear reducer, a thigh motor front end cover, and a second hip joint rotation pin. The thigh motor rear end cover assembly is secured to the rear end face of the thigh motor housing. A stator iron core winding of the thigh permanent magnet brushless motor is fixedly connected with the thigh motor housing, and a rotor output shaft of the thigh permanent magnet brushless motor inputs a rotation motion of the motor into the thigh motor planetary gear reducer, and the planetary gear reducer outputs the rotation motion to the thigh rod assembly. The thigh motor front end cover is fixedly connected with the thigh motor housing. The first hip joint rotation pin and the second hip joint rotation pin 2 are fixedly connected with the other two end faces of the thigh motor housing, and the first hip joint rotation pin, the second hip joint rotation pin and the robot body together constitute a rotating pair for a side-lift hip joint.

As a preferred technical means, the calf motor assembly comprises a calf motor rear end cover assembly, a calf permanent magnet brushless motor, a calf motor housing, and a calf motor front end cover; an outer end portion of the calf motor rear end cover assembly is covered with an anti-fall motor protection plate for reducing an impact force acting on an internal system structure, and a circle of protrusions for transferring an impact force are disposed on the anti-fall motor protection plate at one end face in fit with the outer ring of the calf motor rear end cover assembly. The anti-fall motor protection plate is fixed on the calf motor rear end cover assembly, and the calf motor rear end cover assembly is fixed to the end face of the calf motor housing. A lateral impact force from the outside is transferred and transformed by the anti-fall motor protection plate, and then passed through the protrusions to the outer ring of the calf motor rear end cover assembly, and further the outer ring of the calf motor rear end cover assembly directly transfers the impact force to the calf motor housing, thereby avoiding damage to the internal parts of the motor.

As a preferred technical means, the leg power system structure is provided with a brake assembly that comprises an elastic brake plate, a motor rear end cover, a brake driver, and a brake wire. The brake driver is fixed on the motor rear end cover (or on the motor housing). One end of the brake wire is connected to the elastic brake plate through the motor rear end cover, and the other end of the brake wire is connected to an output end of the brake driver. One end of the elastic brake plate is fixed to the rear end cover, and the other end of the elastic brake plate is provided with a brake pad with a high friction coefficient. When the brake driver is not actuated, by its own elasticity, the elastic brake plate causes one end, with the brake pad, of the elastic brake plate to push against a motor rotor, and in this case, the motor cannot be rotated and is locked. When the brake driver pulls the brake wire, the friction end of the elastic brake plate is separated from the a motor rotor, so that the motor rotor which is originally pre-tightened by the elastic friction of the elastic brake plate can rotate freely, and the motor may start normal rotation; and thus the device realizes the brake control over the joint motor.

As a preferred technical means, the side-lift hip joint motor assembly comprises a side-lift hip joint motor rear end cover assembly, a side-lift hip joint permanent magnet brushless motor, a side-lift hip joint motor housing, a side-lift hip joint motor planetary gear reducer and a side-lift hip joint motor front end cover; the side-lift hip joint rear end cover assembly is fixedly connected with a rear end face of the side-lift hip joint motor housing; a stator core winding of the side-lift hip joint permanent magnet brushless motor is fixedly connected with the side-lift hip joint motor housing; an outer gear ring of the side-lift hip joint planetary gear reducer is fixedly connected with the inner end surface of the side-lift hip joint motor housing; a rotor output shaft of the side-lift hip joint permanent magnet brushless motor inputs a rotation motion of the motor into the side-lift hip joint planetary gear reducer, and a planetary carrier output shaft of the side-lift hip joint planetary gear reducer outputs the rotation motion to a side-lift hip joint driving crank; and the side-lift hip joint front end cover is fixedly connected with the side-lift hip joint motor housing. A side-lift hip joint driven crank is fixedly connected with the thigh motor assembly, and the side-lift hip joint driving crank, a side-lift hip joint link; the side-lift hip joint driven crank and the body together constitute a parallelogram link transmission mechanism. The parallelogram transmission mechanism has a simple structure, large transmission torque and small transmission gap, and is stable and reliable.

Compared with the prior art, the present invention has the following beneficial effects:

The present invention consists essentially of a body and four separate leg modules, and each leg module is comprised of a thigh motor assembly, a calf motor assembly, a hip joint motor assembly and an associated linkage and fixing base of the hip joint motor assembly. The hip joint motor drives the thigh and calf assembly through a parallelogram mechanism, the thigh motor assembly directly drives the thigh rod assembly, and the calf motor assembly drives the calf assembly through an anti-parallelogram mechanism. When a thigh of the robot is impacted laterally because the robot falls laterally, the anti-fall motor protection plate at the outermost side of the thigh disperses and concentrates the external impact force on the circumference of the calf motor end cover, and further directly transfers the external impact force to the calf motor housing, and the external impact force acting on the calf motor housing will be transferred directly to the thigh motor housing through the calf motor housing, the thigh rod assembly and the thrust bearing, and then transferred to the body to prevent the impact force from damaging precision structures inside the thigh and calf motors, so that the present invention has strong external impact resistance. Each of the motor assemblies used in the present invention has a built-in integrated planetary gear reducer, and the motor and the reducer are highly integrated, thus achieving the advantages of compact structure and light weight. The joint motor assemblies of the present invention are independent of each other and all the motor assemblies are modularized, which is beneficial to reduction of the cost; and the joints on the robot body, formed by using the motor assemblies have a large working space, thus ensuring the movement flexibility of the robot.

BRIEF DESCRIPTION OF THE DRAWINGS

FIG. 2.a is an axonometric view of a single leg module;
FIG. 2.b is an exploded axonometric view of a single leg module
FIG. 2.c is a schematic view of a hip joint transmission linkage of a single leg module;
FIG. 3.1 is a structural schematic view of a thigh and calf assembly;
FIG. 3.2 is a side view of the structure of a thigh base and a calf assembly;
FIG. 3.3 is a cross-sectional view taken along line A-A of FIG. 3.2 and a schematic diagram of the principle of lateral collision avoidance;
FIG. 4.a is an axonometric view of a calf link;
FIG. 4.b is a schematic view of the anti-parallelogram linkage transmission structure of the calf link;
FIG. 8.a is an exploded view of the thigh rod assembly;
FIG. 8.b is a schematic view of a built-in heat dissipation cycle of the thigh rod assembly;
FIG. 9.1 is a schematic view of a rear end cover assembly of each joint motor assembly;
FIG. 9.2 is an exploded view of the rear end cover assembly of each joint motor assembly;
FIG. 9.3 is a partial cross-sectional view of the rear end cover assembly of each joint motor assembly;
FIG. 10.1 is a schematic view of a calf structure;
and
FIG. 10.2 is a structural schematic view of a foot assembly;

DESCRIPTION OF REFERENCE SIGNS

Body 1; first leg module 2; second leg module 3; third leg module 4; fourth leg module 5; thigh and calf assembly 3.1; side-lift hip joint driving crank 3.2; side-lift hip joint link 3.3; side-lift hip joint driven crank 3.4; side-lift hip joint motor assembly 3.5; thigh motor assembly 3.1.1; thrust bearing 3.1.2; thigh rod assembly 3.1.3; calf driving crank 3.1.4; calf motor assembly 3.1.5; calf rotation pin 3.1.6; calf drive link 3.1.7; calf assembly 3.1.8; side-lift hip joint motor rear end cover assembly 3.5.1; side-lift hip joint permanent magnet brushless motor 3.5.2; side-lift hip joint motor housing 3.5.3; side-lift hip joint motor planetary gear reducer 3.5.4; side-lift hip joint motor front end cover 3.5.5; thigh motor rear end cover assembly 3.1.1.1; thigh permanent magnet brushless motor 3.1.1.2; thigh motor housing 3.1.1.3; first hip joint rotation pin 3.1.1.4; thigh motor planetary gear reducer 3.1.1.5; thigh motor front end cover 3.1.1.6; second hip joint rotation pin 3.1.1.8; anti-fall motor protection plate 3.1.5.1; calf motor rear end cover assembly 3.1.5.2; calf permanent magnet brushless motor 3.1.5.3; calf motor housing 3.1.5.4; calf motor planetary gear reducer 3.1.5.5; calf motor front end cover 3.1.5.6; first cooling fin group 3.1.5.7; cooling fan 3.1.3.1; second cooling fin group 3.1.3.2; thigh base 3.1.3.3; thigh rod 3.1.3.4; knee joint bearing set 3.1.8.1; knee joint base 3.1.8.2; calf rod 3.1.8.3; foot assembly 3.1.8.4; elastic brake plate 3.5.1.1; motor rear end cover 3.5.1.2; brake driver 3.5.1.3; brake rocker arm 3.5.1.4; brake wire 3.5.1.5; foot cover 3.1.8.4.1; force sensor 3.1.8.4.2; foot base 3.1.8.4.5; and foot pad 3.1.8.4.6.

In order to make the objectives, technical solutions and advantages of the present invention more comprehensible, the present invention will be further described in detail below in conjunction with the drawings and embodiments. It should be understood that the preferred embodiments described here are only for explaining the present invention rather than limiting it.

On the contrary, the present invention is to cover any alternatives, modifications, and equivalent methods and solutions made within the spirit and scope of the invention as defined by the appended claims. Further, in order to provide a better understanding of the present invention, the specific details are elaborated in the following detailed description of the present invention. The present invention may be fully understood by those skilled in the art without a description of these details.

It should be noted that, when an element is described as "fixed on" another element, the element may be directly arranged on another element or there may be an intermediate element. When an element is considered as "connected" with another element, the element may be directly connected to another element or there may be an intermediate element. In contrast, when an element is referred to as being "directly on" another element, there is no intermediate element. Unless otherwise defined, all technical and scientific terms uses herein have the same meanings as the ordinary understandings of those skilled in the technical field to which the present invention belongs. Terms used herein are only for describing specific embodiments, not for limiting the present invention. The term "and/or" used herein includes one or any and all of combinations of multiple relevant listed items.

Figure 1:
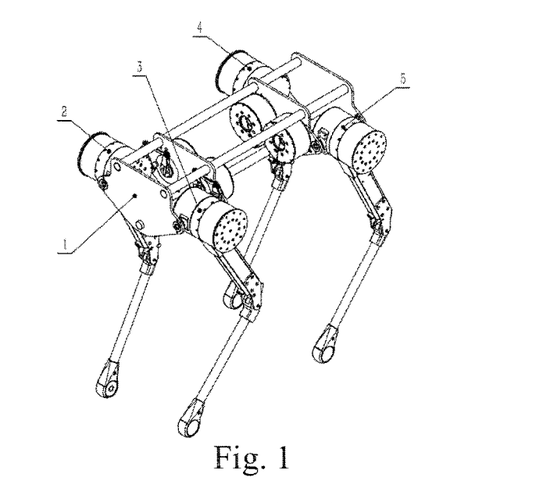
FIG. 1 is a schematic view of a complete four-legged robot.

As shown in FIG. 1, the mechanical structure of the four-legged robot of the present invention comprises a body 1 and four separate leg modules, and the four separate leg modules include: a first leg module 2, a second leg module 3, a third leg module 4, and a fourth leg module 5. The four separate leg modules are symmetrically arranged on both sides of the body, and each leg module is connected and fixed to the body by a rotating pair.

Figure 2:
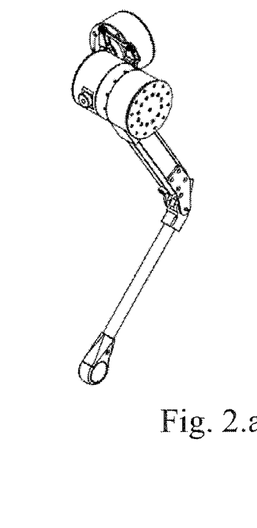

As shown in FIG. 2.a, FIG. 2.b, and FIG. 2.c, a leg module structure comprises a thigh and calf assembly 3.1 and a side-lift hip joint motor assembly 3.5. A side-lift hip joint driving crank 3.2, a side-lift hip joint link 3.3, a side-lift hip joint driven crank 3.4 and a body 1 together constitute a parallelogram link transmission mechanism. The side-lift hip joint driven crank 3.4 is fixedly connected with the thigh motor assembly 3.5, the side-lift hip joint motor assembly 3.5 is fixed on the body, the side-lift hip joint driving crank 3.2 is fixed to an output shaft of a side-lift hip joint motor planetary gear reducer 3.5.4 of the side-lift hip joint motor assembly 3.5, the output shaft of the side-lift hip joint planetary gear reducer 3.5.4 drives the side-lift hip joint driving crank 3.2 to make a rotating motion, and transfers the motion to the thigh and calf assembly 3.1 through a parallelogram mechanism. The parallelogram mechanism has large transmission torque, small transmission gap and simple structure, and is stable and reliable.

Figure 31:
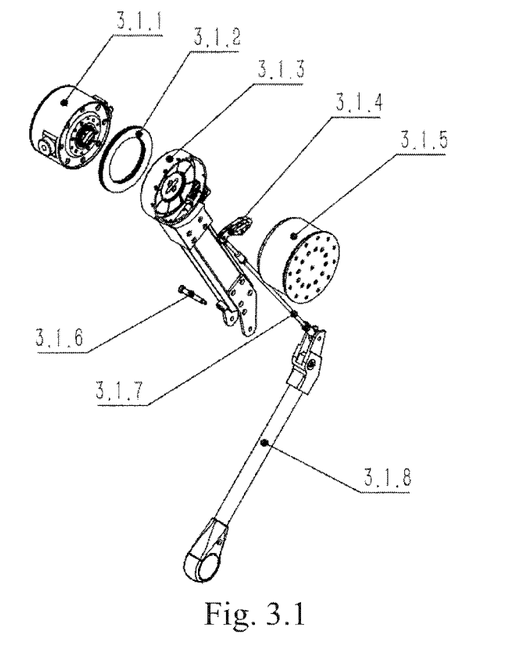
Figure 32:
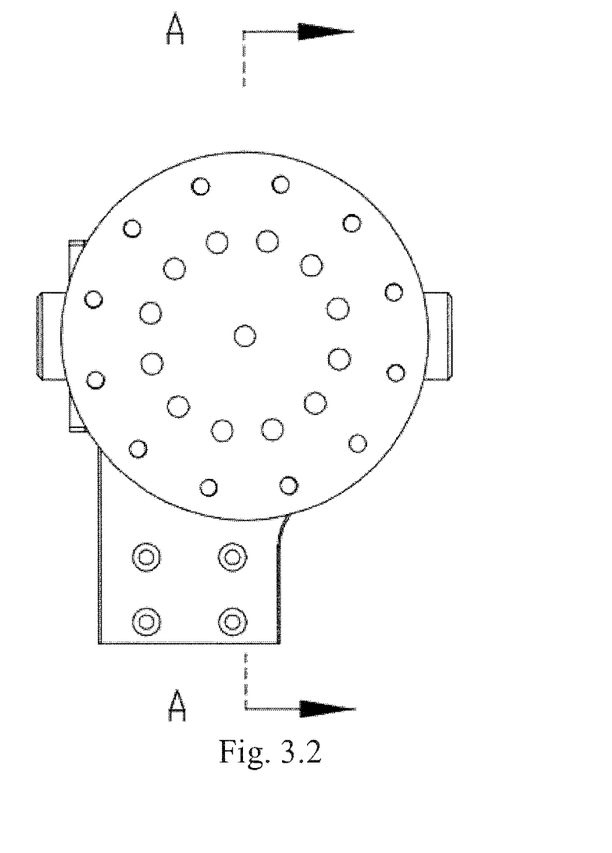
Figure 33:
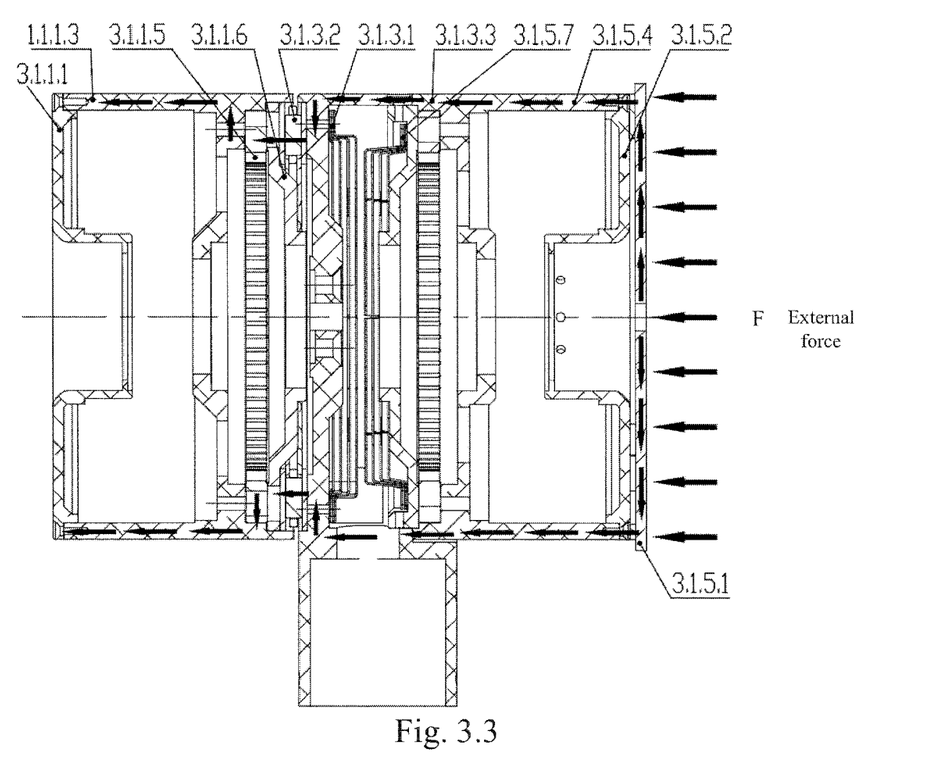

As shown in FIG. 3.1, FIG. 3.2 and FIG. 3.3, the thigh and calf assembly 3.1 comprises a thigh motor assembly 3.1.1, a thrust bearing 3.1.2, a thigh rod assembly 3.1.3, a calf driving crank 3.1.4, a calf motor assembly 3.1.5, a calf drive link 3.1.7, a calf assembly 3.1.8, and a calf rotation pin 3.1.6. The calf motor assembly 3.1.5 is fixedly connected with the thigh rod assembly 3.1.3, the calf driving crank 3.1.4 is fixedly connected with an output shaft of a calf motor planetary gear reducer 3.1.5.5 of the calf motor assembly 3.1.5, and the output shaft of the calf motor planetary gear reducer 3.1.5.5 drives the calf driving crank 3.1.4 to rotate. The calf rotation pin 3.1.6 is fixedly connected with an end pin hole of the thigh rod assembly 3.1.3, and the calf assembly 3.1.8 constitutes a rotating pair together with the calf rotation pin 3.1.6 through a built-in bearing set 3.1.81.

Figure 4:
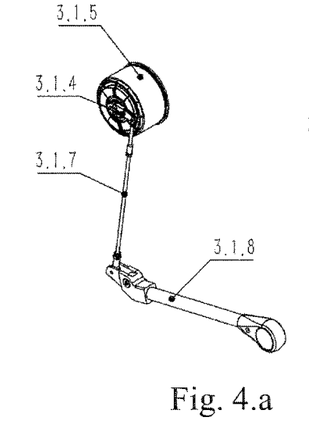

As shown in FIG. 3.1, FIG. 4.*a*, and FIG. 4.*b*, the calf driving crank 3.1.4, the calf drive link 3.1.7, the calf assembly 3.1.8 and the thigh rod assembly 3.1.3 constitute an anti-parallelogram mechanism, which achieves the advantages of compact structure, small occupied space, small transmission gap, and good stability and reliability; moreover, the entire anti-parallelogram mechanism may be placed inside the thigh rod assembly 3.1.3 to avoid damage to fragile link parts when the four-legged robot falls or is collided.

As shown in FIG. 3.1, FIG. 3.2 and FIG. 3.3, the thigh rod assembly 3.1.3 is fixedly connected with an output shaft of a thigh motor planetary gear reducer 3.1.1.5, and the output shaft of the thigh motor planetary gear reducer 3.1.1.5 drives the thigh rod assembly 3.1. 3 to rotate, where the thrust bearing 3.1.2 is arranged between the thigh motor assembly 3.1.1 and the thigh rod assembly 3.1.3. When the four-legged robot falls, the impact of the ground or an obstacle on a leg of the robot is transferred to the body through an anti-fall motor protection plate 3.1.5.1, a calf motor rear end cover assembly 3.1.5.2, a calf motor housing 3.1.5.4, a thigh base 3.1.3.3, the thrust bearing 3.1.2, a thigh motor housing 3.1.1.3, a first side-lift hip joint rotation pin 3.1.1.4 and a second side-lift hip joint rotation pin 2 3.1.1.8; and the external impact is directly transferred through the above-mentioned components with better strength, thereby preventing the fragile structures such as rotors, reducers and bearings in the thigh and calf assembly, and thus improving the impact resistance and reliability of the robot leg.

Figure 5:
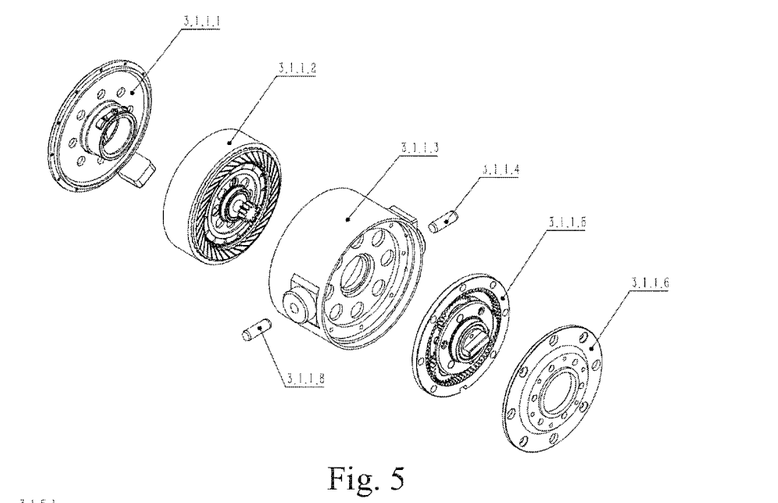
FIG. 5 is an exploded view of a thigh motor assembly.

As shown in FIG. 5, the thigh motor assembly 3.1.1 comprises a thigh motor rear end cover assembly 3.1.1.1, a thigh permanent magnet brushless motor 3.1.1.2, a thigh motor housing 3.1.1.3, a first side-lift hip joint rotation pin 3.1.1.4, a thigh motor planetary gear reducer 3.1.1.5, a thigh motor front end cover 3.1.1.6, and a second side-lift hip joint rotation pin 3.1.1.8. The thigh motor rear end cover assembly 3.1.1.1 is fixedly connected to the rear end face of the thigh motor housing 3.1.1.3. A stator iron core winding of the thigh permanent magnet brushless motor 3.1.1.3 is fixedly connected with the thigh motor housing 3.1.1.3, an outer gear ring of the thigh motor planetary gear reducer 3.1.1.5 is fixed on the inner end face of the thigh motor housing 3.1.1.3, a rotor output shaft of the thigh permanent magnet brushless motor 3.1.1.2 inputs a rotation motion of the motor into the thigh motor planetary gear reducer 3.1.1.5, and the thigh motor planetary gear reducer 3.1.1.5 then outputs the rotation motion to the thigh rod assembly 3.1.3 through a planetary carrier output shaft. The thigh motor front end cover 3.1.1.6 is tightly fixedly connected to the outer gear ring of the thigh motor planetary, gear reducer 3.1.1.5 and the thigh motor housing 3.1.1.3. The first side-lift hip joint rotation pin 3.1.1.4 and the second side-lift hip joint rotation pin 23.1.1.8 are fixedly connected to the thigh motor housing 3.1.13. The first side-lift hip joint rotation pin 3.1.1.4 and the second side-lift hip joint rotation pin 2 3.1.1.8 together with the body 1 constitute a rotating pair.

Figure 6:
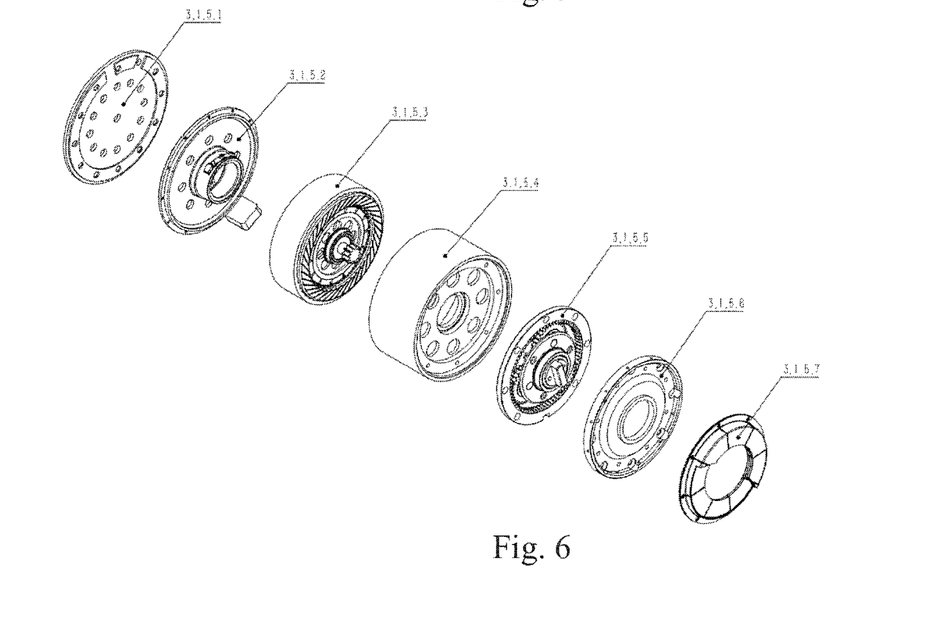
FIG. 6 is an exploded view of a knee joint calf motor.

As shown in FIG. 6, the calf motor assembly 3.1.5 comprises an anti-fall motor protection plate 3.1.5.1, a calf motor rear end cover assembly 3.1.5.2, a calf permanent magnet brushless motor 3.1.5.3, a calf motor housing 3.1.5.4, a calf motor planetary gear reducer 3.1.5.5, a calf motor front end cover 3.1.5.6, and a first cooling fin 3.1.5.7. The anti-fall motor protection plate 3.1.5.1 is fixedly connected with the calf motor rear end cover assembly 3.1.5.2, the calf motor rear end cover assembly 3.1.5.2 is fixedly connected with an end face of the calf motor housing 3.1.5.4, and an external lateral impact force is transferred to the calf motor housing 3.1.5.4 through the anti-fall motor protection plate 3.1.5.1 and the outer ring of the calf motor rear end cover assembly 3.1.5.2. A stator iron core winding of the calf permanent magnet brushless motor 3.1.5.3 is fixedly connected with the calf motor housing 3.1.5.4, a gear ring of the calf motor planetary gear reducer 3.1.5.5 is fixed on the inner end face of the calf motor housing 3.1.5.4, a rotor output shaft of the calf permanent magnet brushless motor 3.1.5.3 inputs a rotation motion of the motor into the calf motor planetary gear reducer 3.1.5.5, and an planetary frame output shaft on the thigh motor planetary gear reducer 3.1.5.5 then outputs the rotation motion to the calf driving crank 3.1.4. A calf motor front end cover 3.1.5.6 is fixed connection with the calf motor housing 315.4, and the calf motor front end cover 3.1.1.6 is tightly fixedly connected to the outer gear ring of the calf motor planetary gear reducer 3.1.5.5 and the calf motor housing 3.1.5.4. The first cooling fin group 3.1.5.7 is closely attached and fixed to the calf motor front end cover 3.1.5.6, and heat generated inside the calf motor is transferred to the calf motor front end cover 3.1.5.6 through the calf motor housing 3.1.5.4, and then the heat is transferred to the first cooling fin group 3.1.5.7, and the air flowing around the first cooling fin group 3.1.5.7 takes away the heat, thus achieving a cooling effect for the calf motor assembly 3.1.5.

Figure 7:
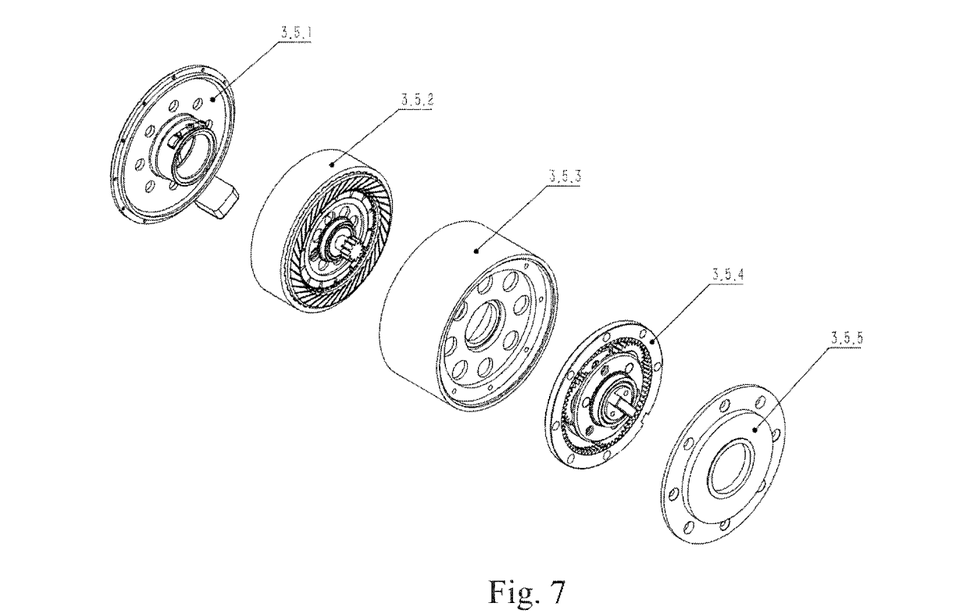
FIG. 7 is a schematic view of the side-lift hip joint motor.

As shown in FIG. 7, the side-lift hip joint motor assembly 3.5 comprises a side-lift hip joint rear end cover assembly 3.5.1, a side-lift hip joint permanent magnet brushless motor 3.5.2, a side-lift hip joint motor housing 3.5.3, a side-lift hip joint planetary gear reducer 3.5.4 and a side-lift hip joint front end cover 3.5.5. The side-lift hip joint rear end cover assembly 3.5.1 is fixedly connected to the rear end face of the side-lift hip joint motor housing 3.5.3. A stator core winding of the side-lift hip joint permanent magnet brushless motor 3.5.2 is fixedly connected to the side-lift hip joint motor housing 3.5.3. The outer gear ring of the side-lift hip joint planetary gear reducer 3.5.4 is fixedly connected with the inner end surface of the side-lift hip joint motor housing 3.5.3, a rotor output shaft of the side-lift hip joint permanent magnet brushless motor 3.5.2 inputs a rotation motion of the motor into the side-lift hip joint planetary gear reducer 3.54, and a planetary carrier output shaft of the side-lift hip joint planetary gear reducer 3.5.4 then outputs the rotary motion to the side-lift hip joint driving crank 3.2. The side-lift hip joint front end cover 3.5.5 is fixedly connected with the side-lift hip joint motor housing 3.5.3, and the side-lift hip joint front end cover 3.5.5 is tightly fixedly connected to the outer gear ring of the side-lift hip joint planetary gear reducer 3.5.4 and the side-lift hip joint motor housing 3.5.3.

Figure 8:
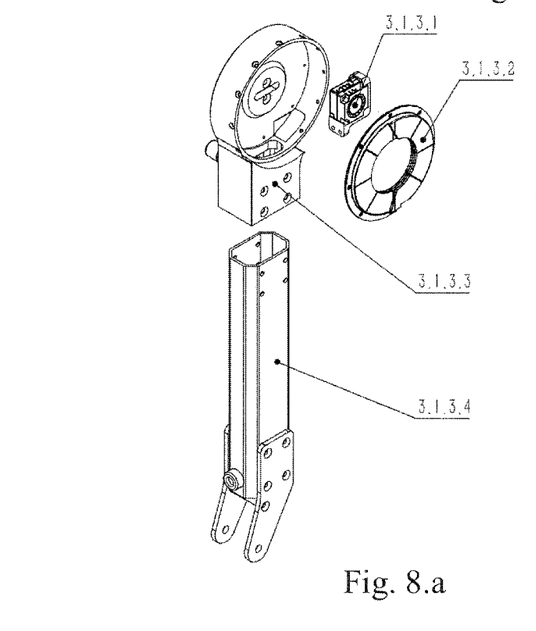

As shown in FIG. 8.*a* and FIG. 8.*b*, the thigh rod assembly 3.1.3 comprises a cooling fan 3.1.3.1, a second cooling fin group 3.1.3.2, a thigh base 3.1.3.3, and a thigh rod 3.1.3.4. The thigh rod 3.1.3.4 is fixedly connected with the thigh base 3.13.3; the second cooling fin group 3.1 is fixed on an inner wall of the thigh base 3.1.3.3; the cooling fan 3.1.3.1 is fixed on the thigh base 3.1.3.3; the thigh base 3.1.3.3 is provided with an air inlet; and the cooling fan 3.1.3.1 blows external cold air through the air inlet into a cavity formed by the thigh base 11.3.3 and the calf motor assembly 3.1.5, so that heat transferred to the second cooling fin group 3.1.3.2 and the first cooling fin group 3.1.5.7 from the calf motor housing 3.1.5.4 and the calf motor front end cover 3.1.5.6 is taken away by the cold air and discharged through the hollow thigh rod 3.1.3.4, thus realizing the active cooling for the motor system.

Figure 91:
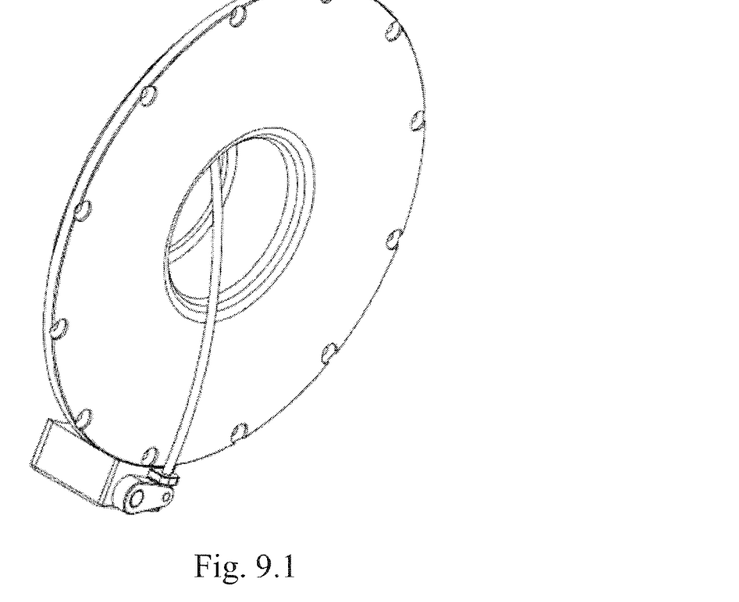
Figure 92:
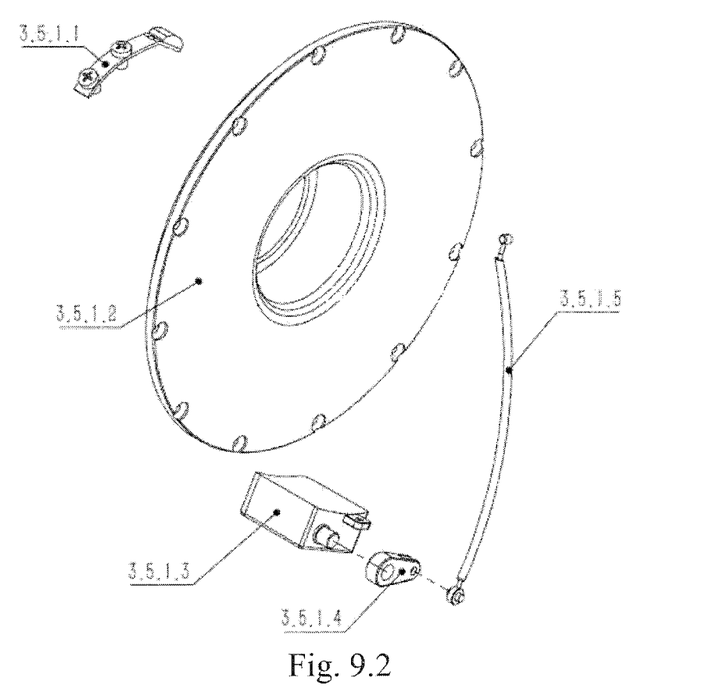
Figure 93:
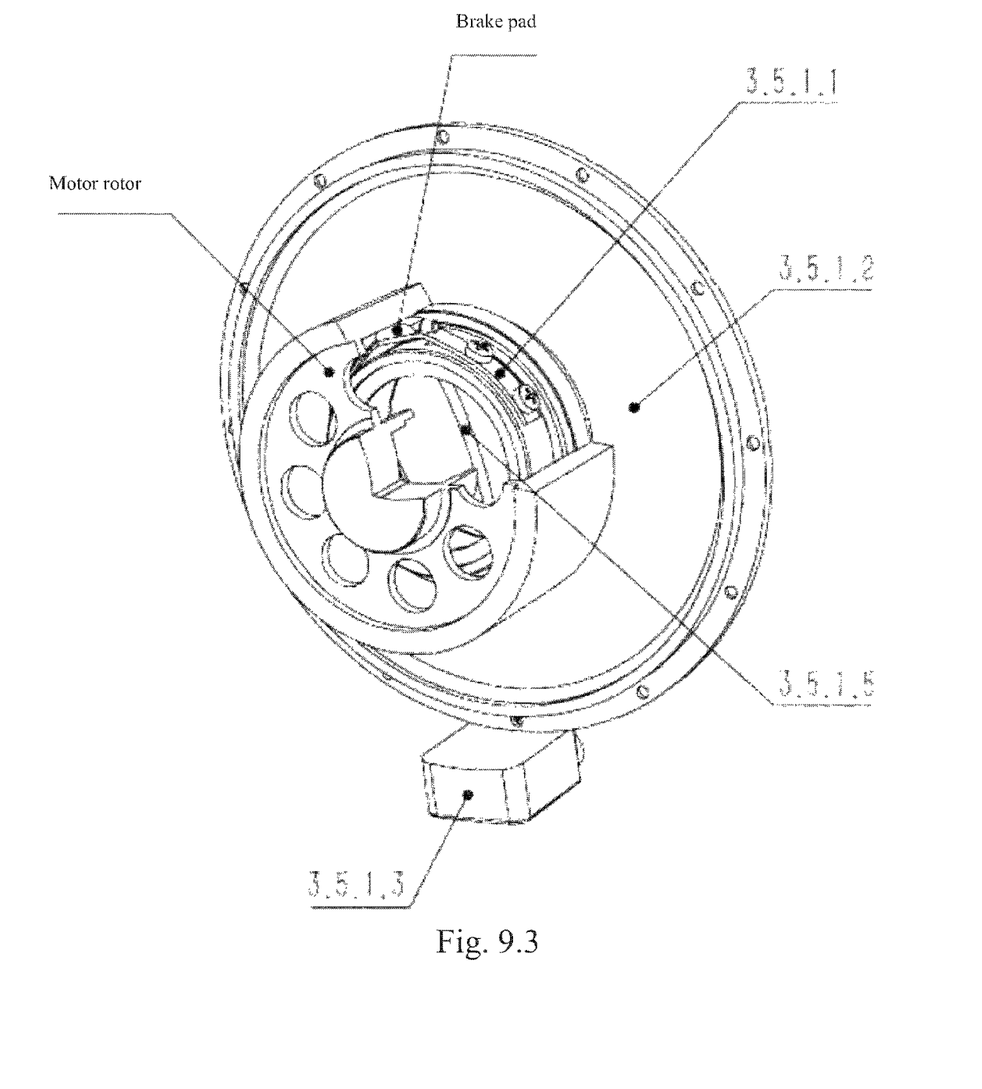

As shown in FIG. 9.1, FIG. 9.2, and FIG. 9.3, the rear end cover assemblies on the side-lift hip joint assembly 3.5, the thigh motor assembly 3.1.1, and the calf motor assembly 3.1.5, including the thigh motor rear end cover assembly 3.1.1.1, the calf motor rear end cover assembly 3.1.5.2, the side-lift hip joint motor rear end cover assembly 3.5.1, are similar in structure. Each of the rear end cover assemblies is provided with a brake assembly, comprising an elastic brake plate 3.5.1.1, a rear end cover 3.5.1.2, a brake driver 3.5.1.3, a brake rocker arm 3.5.1.4, and a brake wire 3.5.1.5. The brake driver 3.5.1.3 is fixed on the rear end cover 3.5.1.2 or the motor housing, and an output shaft of the brake driver 3.5.1.3 drives the brake rocker arm 3.5.1.4 to rotate. One end of the brake wire 3.5.1.5 passes through a hole in the rear end cover 3.5.1.2 and is fixedly connected to the elastic brake plate 3.5.1.1, and the other end of the brake wire 3.5.1.5 is connected to an output end of the brake driver. One end of the elastic brake plate 3.5.1.1 is fixedly connected to the rear end cover 3.1.5.2. When the brake driver 3.5.1.3 is not actuated, the end, with a friction body, of the elastic brake plate 3.5.1.1 pushes against the rotor of the permanent magnet brushless motor 3.1.1.2 by its own elasticity, thereby achieving friction braking to the motor rotor. On the other hand, when the brake driver 3.5.1.3 pulls the brake wire 3.5.1.5 to pull the end, with the friction body, of the elastic brake plate 3.5.1.1 away from a motor rotor, the motor rotor can start normal rotation, and thus the device realizes brake control for each joint.

Figure 101:
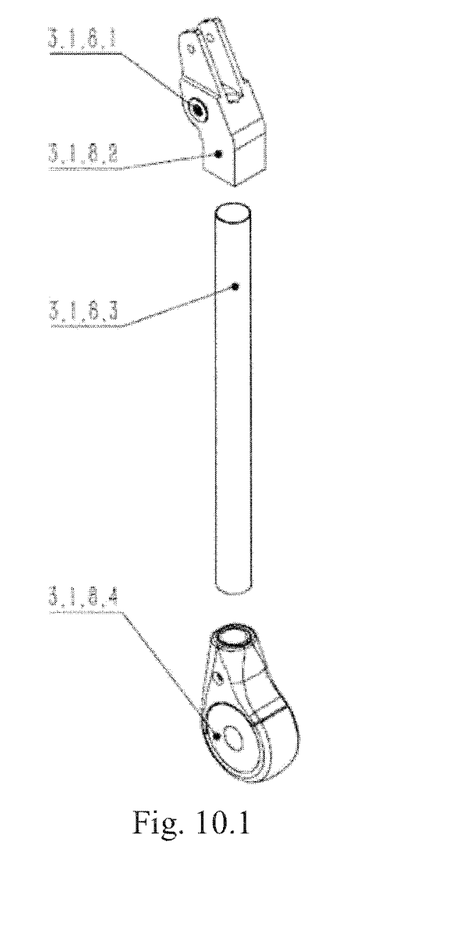
Figure 102:
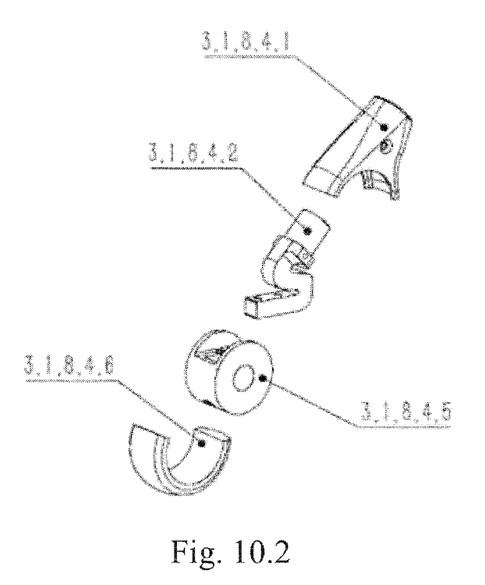

As shown in FIG. 10.1 and FIG. 10.2, a foot assembly 3.1.8.4 comprises a foot cover 3.1.8.4.1, a force sensor 3.1.8.4.2, a foot base 3.1.8.4.5, and a foot pad 3.1.8.4.6. The calf rod 3.1.8.3, the force sensor 3.1.8.4.2, the foot base 3.1.8.4.5 and the foot pad 3.1.8.4.6 are sequentially fixed together. The foot cover 3.1.8.4.1 is fixed with the upper end of the force sensor 3.1.8.4.2 and the calf rod 3.1.8.3. A strain gauge is attached to the force sensor 3.1.8.4.2.

Each of the permanent magnet brushless motors involved in the present invention may be an inner rotor motor or an outer rotor motor.

The embodiments mentioned above are merely preferred embodiments of the present invention and not intended to limit the present invention. Any of modifications, equivalent substitutions, improvements, etc. made within the spirit and principle of the present invention shall be covered in the protection scope of the present invention.

The invention claimed is:

1. A leg power system structure of an electrically driven four-legged robot, comprising a body and four independent leg modules (i.e., a first leg module, a second leg module, a third leg module, and a fourth leg module), wherein the four independent leg modules are arranged in a bilateral symmetry on both sides of the body, and each leg module is connected and fixed to the body by a rotating pair; and each leg module comprises a thigh and calf assembly and a side-lift hip joint motor assembly.

2. The leg power system structure of an electrically driven four-legged robot according to claim 1, wherein the thigh and calf assembly comprises a thigh motor assembly, a thigh rod assembly, a calf motor assembly, and a calf assembly.

3. The leg power system structure of an electrically driven four-legged robot according to claim 2, wherein the thigh rod assembly is provided with a thigh base and a thigh rod, wherein the thigh base is used for accommodating a calf driving crank and a calf drive link; the thigh rod is a through cavity open at the lower end, and an end portion of the thigh rod is provided with an end pin hole for passing a calf rotation pin; the calf rotation pin passes through the end pin hole of the thigh rod assembly and the upper end of the calf assembly; and the calf assembly constitutes a rotating pair together with the calf rotation pin through a built-in bearing pack.

4. The leg power system structure of an electrically driven four-legged robot according to claim 3, wherein the drive link is disposed inside the thigh rod assembly, the calf driving crank, the calf drive link, the calf assembly and the thigh rod assembly together constitute an anti-parallelogram link transmission mechanism, an output shaft of the calf motor assembly is fixedly connected with the calf driving crank, and the output shaft of the calf motor assembly drives the calf driving crank to rotate.

5. The leg power system structure of an electrically driven four-legged robot according to claim 2, wherein an output shaft of the thigh motor assembly is fixed to one side of the upper end portion of the thigh rod assembly, and a thrust bearing is disposed between the thigh motor assembly and the upper end portion of the thigh rod assembly; and the calf motor assembly is fixedly mounted on the other side of the upper end portion of the thigh rod assembly.

6. The leg power system structure of an electrically driven four-legged robot according to claim 2, wherein the thigh rod assembly comprises a cooling fan, a second cooling fin group, a thigh base, and a thigh rod; the thigh rod is fixedly connected with the thigh base; the second cooling fin group is fixed on an inner wall of the thigh base; the cooling fan is fixed on the thigh base; the thigh base is provided with an air inlet, and the cooling fan blows external cold air through the air inlet into a cavity formed by the thigh base and the calf motor assembly, so that heat gathered on the second cooling fin group and a first cooling fin group is taken away by the cold air and discharged to the external environment through the hollow thigh rod.

7. The leg power system structure of an electrically driven four-legged robot according to claim 2, wherein the calf motor assembly comprises an anti-fall motor protection plate, a calf motor rear end cover assembly, a calf permanent magnet brushless motor, a calf motor housing, a calf motor planetary gear reducer, a calf motor front end cover, and the first cooling fin group; the anti-fall motor protection plate is fixedly connected with the calf motor rear end cover assembly, and the calf motor rear end cover assembly is fixedly connected with an end face of the calf motor housing; the anti-fall motor protection plate transfers a lateral impact force from the outside to the calf motor housing through an outer ring of the calf motor rear end cover assembly; a stator core winding of the calf permanent magnet brushless motor is fixedly connected to the calf motor housing; a gear ring of the calf motor planetary gear reducer is fixedly connected with an inner end face of the calf motor housing; a rotor output shaft of the calf permanent magnet brushless motor inputs a rotation motion of the motor into the calf motor planetary gear reduce, and a planetary carrier output shaft on the calf motor planetary gear reducer then outputs the rotation motion to the calf driving crank; the calf motor front end cover is fixedly connected with the calf motor housing; the first cooling fin group is tightly attached and fixed to the calf motor front end cover, heat generated inside the calf motor is transferred to the calf motor front end cover through the calf motor housing, and then the heat is transferred to the first cooling fin group.

8. The leg power system structure of an electrically driven four-legged robot according to claim 2, wherein the thigh motor assembly comprises a thigh motor rear end cover assembly, a thigh permanent magnet brushless motor, a thigh motor housing, a thigh motor planetary gear reducer, and a thigh motor front end cover; the thigh motor rear end cover assembly is fixedly connected to a rear end face of the thigh motor housing; a stator core winding of the thigh permanent magnet brushless motor is fixedly connected to the thigh motor housing; an outer gear ring of the thigh motor planetary gear reducer is fixedly connected with an inner end face of the thigh motor housing; a rotor output shaft of the thigh permanent magnet brushless motor inputs a rotation motion of the motor into the thigh motor planetary gear reducer; and the thigh motor planetary gear reducer then outputs the rotation motion to the thigh rod assembly through a planetary earner output shaft.

9. The leg power system structure of an electrically driven four-legged robot according to claim 2, wherein the calf motor assembly comprises a calf motor rear end cover assembly, a calf permanent magnet brushless motor, and a calf motor housing; an outer end portion of the calf motor rear end cover assembly is covered with an anti-fall motor protection plate for reducing an impact force acting on an internal system structure, and a circle of protrusions for transferring an impact force are disposed on the anti-fall motor protection plate at one end face in fit with the calf motor rear end cover assembly.

10. The leg power system structure of an electrically driven four-legged robot according claim 2, wherein the side-lift hip joint motor assembly comprises a side-lift hip joint motor rear end cover assembly, a side-lift hip joint permanent magnet brushless motor, a side-lift hip joint motor housing, and a side-lift hip joint motor planetary gear reducer and a side-lift hip joint motor front end cover; the side-lift hip joint rear end cover assembly is fixedly connected with a rear end face of the side-lift hip joint motor housing; a stator core winding of the side-lift hip joint permanent magnet brushless motor is fixedly connected with the side-lift hip joint motor housing; an outer gear ring of the side-lift hip joint planetary gear reducer is fixedly connected with an inner end surface of the side-lift hip joint motor housing; a rotor output shaft of the side-lift hip joint permanent magnet brushless motor inputs a rotation motion of the motor into the side-lift hip joint planetary gear reducer, and a planetary carrier output shaft of the side-lift hip joint planetary gear reducer outputs the rotation motion to a side-lift hip joint driving crank; and the side-lift hip joint front end cover is fixedly connected with the side-lift hip joint motor housing.

11. The leg power system structure of an electrically driven four-legged robot according to claim 1, wherein the leg power system structure is provided with a brake assembly, comprising an elastic brake plate, a motor rear end cover, a brake driver, and a brake wire; the brake driver is fixed on the motor rear end cover or fixed on the motor housing, and the brake driver pulls the brake wire to disengage a brake pad on the elastic brake plate from a motor rotor, so that the motor rotor which is originally pre-tightened by the elastic brake plate through elastic friction can rotate freely.

* * * * *